(12) United States Patent
Abdallah

(10) Patent No.: US 12,428,132 B2
(45) Date of Patent: Sep. 30, 2025

(54) MULTI-STAGE PROPELLER SYSTEM

(71) Applicant: University Of Cincinnati, Cincinnati, OH (US)

(72) Inventor: Shaaban Abdallah, Cincinnati, OH (US)

(73) Assignee: University of Cincinnati, Cincinnati, OH (US)

( * ) Notice: Subject to any disclaimer, the term of this patent is extended or adjusted under 35 U.S.C. 154(b) by 0 days.

(21) Appl. No.: 18/260,555

(22) PCT Filed: Jan. 7, 2022

(86) PCT No.: PCT/US2022/011527
§ 371 (c)(1),
(2) Date: Jul. 6, 2023

(87) PCT Pub. No.: WO2022/150534
PCT Pub. Date: Jul. 14, 2022

(65) Prior Publication Data
US 2024/0051657 A1     Feb. 15, 2024

Related U.S. Application Data

(60) Provisional application No. 63/134,698, filed on Jan. 7, 2021.

(51) Int. Cl.
*B64C 11/48* (2006.01)
*B64U 10/10* (2023.01)
(Continued)

(52) U.S. Cl.
CPC .............. *B64C 11/48* (2013.01); *B64U 10/10* (2023.01); *B64U 30/24* (2023.01); *B64U 10/14* (2023.01)

(58) Field of Classification Search
CPC .......... B64C 11/48; B64U 30/24; B64U 50/27
See application file for complete search history.

(56) References Cited

U.S. PATENT DOCUMENTS 4,604,032 A * 8/1986 Brandt ................... B64C 11/48
                                                                416/129
9,815,552 B1   11/2017 Welsh
(Continued)

FOREIGN PATENT DOCUMENTS

| | | |
|---|---|---|
| CN | 208715470 U | 4/2019 |
| GB | 433989 A | 8/1935 |
| WO | 2017165456 A1 | 9/2017 |

OTHER PUBLICATIONS

U.S. Patent and Trademark Office; Search Report and Written Opinion in related International Patent Application No. PCT/US2022/011527 dated Apr. 8, 2022; 10 pages.
(Continued)

*Primary Examiner* — Joshua J Michener
*Assistant Examiner* — Cindi M Curry
(74) *Attorney, Agent, or Firm* — Wood Herron & Evans LLP

(57) ABSTRACT

A propulsion system (50) is disclosed. The propulsion system (50) includes a first propeller (52), a second propeller (54), and a third propeller (56). The first propeller (52), the second propeller (54), and the third propeller (56) are arranged to rotate about a common axis and the second propeller (54) is disposed between the first propeller (52) and the third propeller (56). The first and third propellers (52, 56) are configured to rotate about the common axis in a first direction (A) and the second propeller (54) is configured to rotate about the common axis in a second direction (B) opposite to the first direction (A). A first motor (60) may be coupled to the first and third propellers (52, 56) and a second motor (64) may be coupled to the second propeller (Continued)

(54). A first shaft (58) and second shaft (62) may be arranged along the common axis, wherein the first and third propellers (52, 56) are coupled to the first shaft (58) and the second propeller (54) is coupled to the second shaft (62).

8 Claims, 3 Drawing Sheets

(51) Int. Cl.
    *B64U 10/14*      (2023.01)
    *B64U 30/24*      (2023.01)

(56) References Cited

U.S. PATENT DOCUMENTS

| | | | |
|---|---|---|---|
| 10,843,795 B2 * | 11/2020 | Prager | B64C 27/022 |
| 12,049,332 B2 * | 7/2024 | Wiberg | B64U 30/21 |
| 2006/0011777 A1 | 1/2006 | Arlton et al. | |
| 2017/0274982 A1 * | 9/2017 | Beckman | B64C 3/54 |
| 2020/0223539 A1 | 7/2020 | Villard | |
| 2021/0101677 A1 * | 4/2021 | Thalheimer | B64C 11/48 |

OTHER PUBLICATIONS

Supplementary European Search Report, Oct. 22, 2024, 9 Pages, European Patent Office.

\* cited by examiner

MULTI-STAGE PROPELLER SYSTEM

CROSS REFERENCE TO RELATED APPLICATION

This application claims the benefit of priority to U.S. Provisional Patent Application Ser. No. 63/134,698, filed Jan. 7, 2021, the disclosure of which is incorporated by reference herein in its entirety.

TECHNICAL FIELD

The invention relates generally to propulsion systems and, more particularly, propulsion systems using counter-rotating propellers.

BACKGROUND

Aircraft such as airplanes, helicopters, and unmanned air vehicles commonly use propulsion systems with propellers to provide thrust for the aircraft. Some aircraft propulsion systems will employ counter-rotating propellers to improve the efficiency and thrust of that propulsion system compared to propulsion systems with only one propeller. Typically, the counter-rotating propellers are mounted on concentric shafts and rotated by a common motor, such that both propellers turn at the same revolutions per minute (RPM). The motor may be an internal combustion engine, an electric motor, or a hybrid motor using fuel and batteries.

Such counter-rotating propellers are often optimized for a particular flight regime, such as for maximum takeoff thrust or maximum efficiency at cruise. The efficiency and thrust gains achieved by the counter-rotating propellers, however, decrease when the counter-rotating propellers are operating in non-optimized regimes, sometimes referred to as "off design".

Propulsion systems using counter-rotating propellers are generally more complex, heavier, and more costly to build and maintain compared to their single propeller counterparts. Thus, to be commercially viable, a propulsion system with counter-rotating propellers needs to be more efficient and provide thrust/lift gains over a wide operating regime. If the gains of a propulsion system with counter-rotating propellers are restricted to a narrow operating regime, then the disadvantages of such a propulsion system may outweigh its benefits.

What is needed therefore is a propulsion system with counter-rotating propellers that provides increased efficiency and/or increased thrust over a wide operating regime.

SUMMARY OF THE INVENTION

To these and other ends, a propulsion system includes a first propeller; a second propeller; and a third propeller, wherein the first propeller, the second propeller, and the third propeller are arranged to rotate about a common axis and the second propeller is disposed between the first propeller and the third propeller. The first propeller and the third are configured to rotate about the common axis in a first direction and the second propeller is configured to rotate about the common axis in a second direction opposite to the first direction.

In one embodiment, this propulsion system further includes a first motor and a second motor. The first motor is coupled to the first and third propellers and configured to rotate the first and third propellers in the first direction, and the second motor is coupled to the second propeller and configured to rotate the second propeller in the second direction. In one aspect of this embodiment, the propulsion system may further include a first shaft and a second shaft arranged along the common axis, wherein the first propeller and the third propeller are coupled to the first shaft and the second propeller is coupled to the second shaft. In anther aspect of this embodiment, the first motor and second motor are arranged along the common axis, wherein the first motor is disposed between the first propeller and the second propeller and the second motor is disposed between the second propeller and the third propeller. In yet another aspect of this embodiment, the first motor and second motor are arranged along the common axis, the first motor and the second motor being disposed between the second propeller and the third propeller. In another aspect of this embodiment, the propulsion system further includes a motor control unit operatively coupled to the first motor and the second motor. The motor control unit is configured to independently control a rotational speed of the first motor and a rotational speed of the second motor.

In an embodiment, the first propeller has a diameter D1, the second propeller has a diameter D2, and the third propeller has a diameter D3, wherein diameter D1 is greater than diameter D2 and diameter D2 is greater than diameter D3.

In one embodiment, the common axis is oriented substantially vertically. In another embodiment, the common axis is oriented substantially horizontally.

In an embodiment, an aircraft having a body includes a propulsion system coupled to the body. The propulsion includes a first propeller; a second propeller; and a third propeller, wherein the first, second, and third propellers are arranged to rotate about a common axis such that the second propeller is disposed between the first propeller and the third propeller. The first propeller and the third are configured to rotate about the common axis in a first direction and the second propeller is configured to rotate about the common axis in a second direction opposite to the first direction.

In an embodiment, the aircraft further includes a first motor and a second motor. The first motor is coupled to the first and third propellers and configured to rotate the first and third propellers in the first direction, and the second motor is coupled to the second propeller and configured to rotate the second propeller in the second direction.

In one aspect of this embodiment, the aircraft may further include a first shaft and a second shaft arranged along the common axis, wherein the first propeller and the third propeller are coupled to the first shaft and the second propeller is coupled to the second shaft.

In an embodiment of this aircraft, the first propeller has a diameter D1, the second propeller has a diameter D2, and the third propeller has a diameter D3, wherein diameter D1 is greater than diameter D2 and diameter D2 is greater than diameter D3.

In an embodiment of this aircraft, the common axis is oriented substantially vertically. In another embodiment, the common axis is oriented substantially horizontally.

In another embodiment, a propulsion system includes a first shaft; a second shaft; a third shaft; a first propeller coupled to the first shaft; a second propeller coupled to the second shaft; and a third propeller coupled to the third shaft. The first shaft, the second shaft, and the third shaft are arranged to rotate about a common axis and the second propeller is disposed between the first propeller and the third propeller. The first shaft and the third shaft are configured to rotate the first propeller and the third propeller, respectively, in a first direction and the second shaft is configured to rotate the second propeller in a second direction opposite the first direction. In one aspect of this embodiment, the first propeller has a diameter D1, the second propeller has a diameter D2, and the third propeller has a diameter D3, wherein diameter D1 is greater than diameter D2 and diameter D2 is greater than diameter D3. In another aspect of this embodiment, the common axis is oriented substantially vertically. In another aspect of this embodiment, the common axis is oriented substantially horizontally.

In an embodiment, this propulsion system further includes a first motor, a second motor, and a third motor, wherein the first motor is coupled to the first shaft, the second motor is coupled to the second shaft, and the third motor is coupled to the third shaft. The first motor is configured to rotate the first propeller in the first direction, the second motor is configured to rotate the second propeller in the second direction, and the third motor is configured to rotate the third propeller in the first direction.

In an embodiment, the common axis is oriented substantially vertically.

In an embodiment, the common axis is oriented substantially horizontally.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

DETAILED DESCRIPTION OF THE INVENTION

Figure 1:
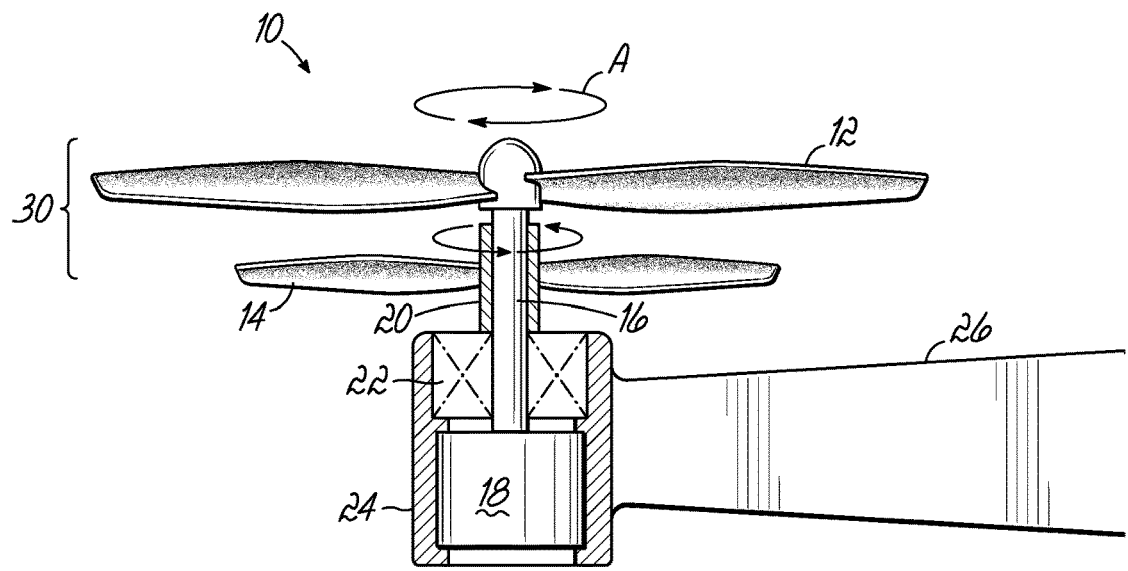
FIG. 1 is an exemplary unmanned aerial vehicle with a propulsion system according to one embodiment of the invention.
Figure 2:
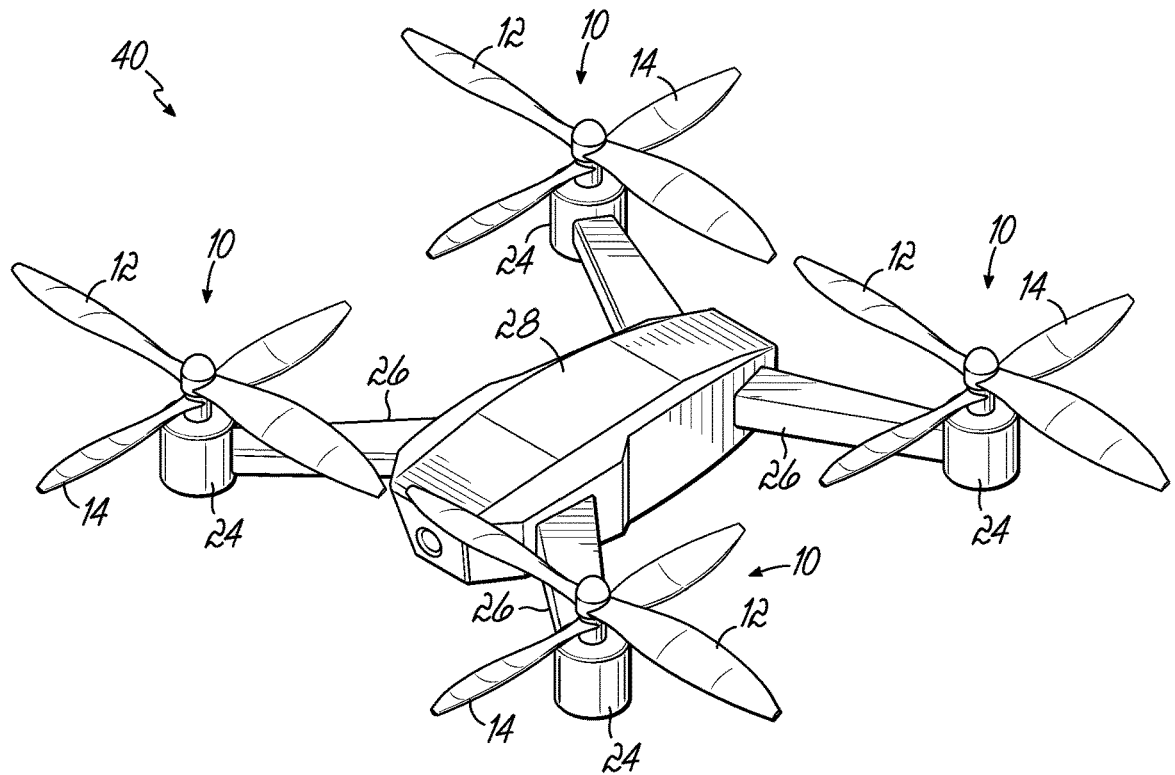
FIG. 2 is a schematic representation of a vertically-oriented, propulsion system with two counter-rotating propellers, each driven by a separate motor.

FIG. 1 is a schematic representation of a propulsion system 10 employing a first propeller 12 and second propeller 14. The propulsion system 10 may be used in a variety of aircraft, such as an unmanned aerial vehicle 40 (UAV) (sometimes referred to as a drone) depicted in FIG. 2, for example. The first propeller 12 is operatively connected to a first shaft 16 which is operatively connected to a first motor 18. Similarly, the second propeller 14 is operatively connected to a second shaft 20 which is operatively connected to a second motor 22. As depicted, first and second shafts 16, 20 are co-axially configured with shaft 16 being positioned inside shaft 20. The first and second motors 18, 22 may be enclosed in a housing 24 which is supported by support arm 26. In an embodiment, the support arm 26 may be connected to a body 28 of the UAV 40 in FIG. 2.

The first and second propellers 12, 14 rotate in opposite directions as noted by arrows A, B, respectively. Looking down onto the first and second propellers 12, 14, arrow A shows the first propeller 12 rotating in a clockwise direction and arrow B shows the second propeller 14 rotating in a counter-clockwise direction. From an aerodynamic standpoint, the first and second propellers 12, 14 with their counter-rotations may be collectively considered a cell 30, which produces a certain amount of thrust. That is, the propulsion system 10 may be considered a single-cell propulsion system.

Single-cell propulsion systems, like propulsion system 10, use two counter-rotating propellers, on UAVs such as UAV 40. To add additional cells (like cell 30) to an aircraft, such as UAV 40, one may add one or more additional pairs of counter-rotating propellers and corresponding motors. Thus, adding just one additional cell would require adding two more propellers, two more motors, and an additional support arm for connecting the additional cell to the body of the UAV. Thus, adding even one additional cell increases the weight and complexity of the UAV and those disadvantages may be greater than the thrust realized from the additional cell.

Figure 3:
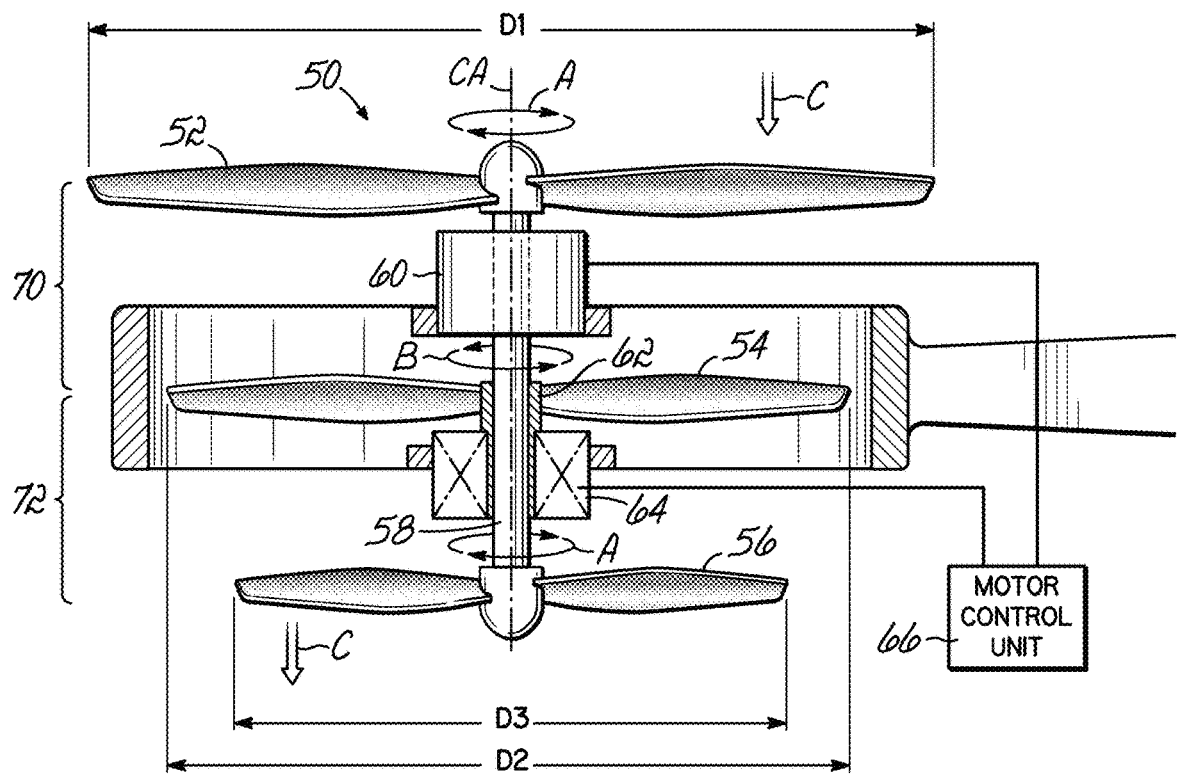
FIG. 3 is a partial cross-sectional, elevation view of a propulsion system according to another embodiment of the invention with three propellers, where the top and bottom propellers rotate in the same direction and the center propeller rotates in the opposite.

According to one embodiment of the invention, a two-cell propulsion system may be created using only three propellers and only two motors. Thus, the advantage of the inventive two-cell propulsion system disclosed herein, is achieving increased thrust with less weight and complexity compared to adding a traditional two-blade cell. Such a two-cell propulsion system may be used on UAV 40, for example. One exemplary embodiment of a two-cell propulsion system 50 using only three propellers 52, 54, 56 is shown in FIG. 3. Propellers 52 and 56 are both connected to a first shaft 58 which is operatively connected to a first motor 60. Propeller 54 is connected to a second shaft 62 which is operatively connected to a second motor 64. The first shaft 58 and the second shaft 62 are arranged about a common axis CA. Thus, the propellers 52, 54, 56 are arranged to rotate about the common axis CA. The first and second motors 60, 64 may be connected to a motor control unit 66, which is configured to control the speed and rotational direction of the first and second motors 60, 64 independently of one another. The first and second motors 60, 64 may be held in a support shroud 68 which is supported by support arm 26 of UAV 40.

Propellers 52, 56 rotate in a clockwise direction (when viewed from above) as indicated by Arrow A. Propeller 54 rotates in a counter-clockwise direction as indicated by Arrow B. The direction of the airflow generated by the rotating propellers is indicated by Arrow C. One cell 70 is formed by propellers 52, 54, which are counter-rotating relative to each other. Another cell 72 is formed by propellers 54, 56, which are counter-rotating relative to each other.

Propeller 52 has a diameter D1; propeller 54 has a diameter D2; and propeller 56 has a diameter D3. In an embodiment, diameter D1 is greater than diameter D2 and diameter D2 is greater than diameter D3. The reduction in propeller diameters from diameter D1 to diameter D3 improves the efficiency of the propulsion system 50. In another embodiment, the diameters D1, D2, and D3 may be the same. The pitch of each propeller 52, 54, 56 may be changed independently of each other.

Figure 4:
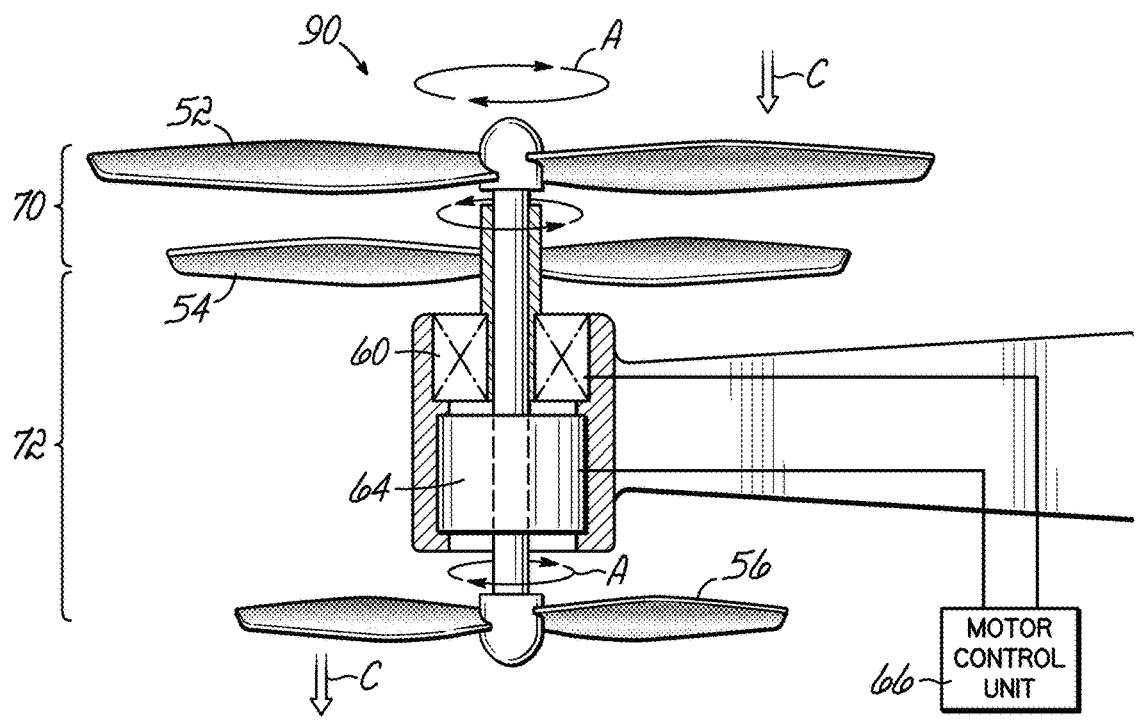
FIG. 4 is a schematic representation of the propulsion system of FIG. 1.

A two-cell propulsion system 90 according to another embodiment of the invention is depicted in FIG. 4. The propulsion system 90 is similar to propulsion system 50 but the components are arranged differently. With propulsion system 50 the motor 60 is disposed between propellers 52, 54 and the motor 64 is disposed between propellers 54, 56. In addition, motor 60 which is operatively connected to first shaft 58 is positioned above motor 64. With propulsion system 90, both motors 60, 64 are positioned adjacent to each other between propellers 54, 56. With this arrangement, the motors 60, 64 may be housed within a more compact housing 92 compared to support shroud 68. The housing 92 may be supported by support arm 26 which may be connected to body 28 of the UAV 40.

As with propulsion system 50, propellers 52, 56 rotate in a clockwise direction (when viewed from above) as indicated by Arrow A and propeller 54 rotates in a counter-clockwise direction as indicated by Arrow B. Again, counter-rotating propellers 52, 54 form cell 70 and counter-rotating propellers 54, 56 form cell 72.

It will be appreciated that FIGS. 3 and 4 illustrate non-limiting examples of a propulsion system with three propellers creating two independent cells. Other arrangements of the shafts and motors may by employed to achieve the two independent cells. In some embodiments a single motor may be utilized where a gear arrangement is used to rotate the two shafts in opposite directions so that two independent cells are created with three propellers. In other embodiments, the placement of the motors relative to the propellers may be different compared to the arrangements for propulsion systems 50, 90. For example, the motors 60, 64 may be adjacent to each other and between propellers 52, 54. In another example, the motors 60, 64 may be adjacent to each other and positioned either above propeller 52 or below propeller 56. In another example, motor 60 may be positioned above propeller 52 and motor 64 may be positioned below the propeller 56. Additional arrangements are contemplated.

Figure 5:
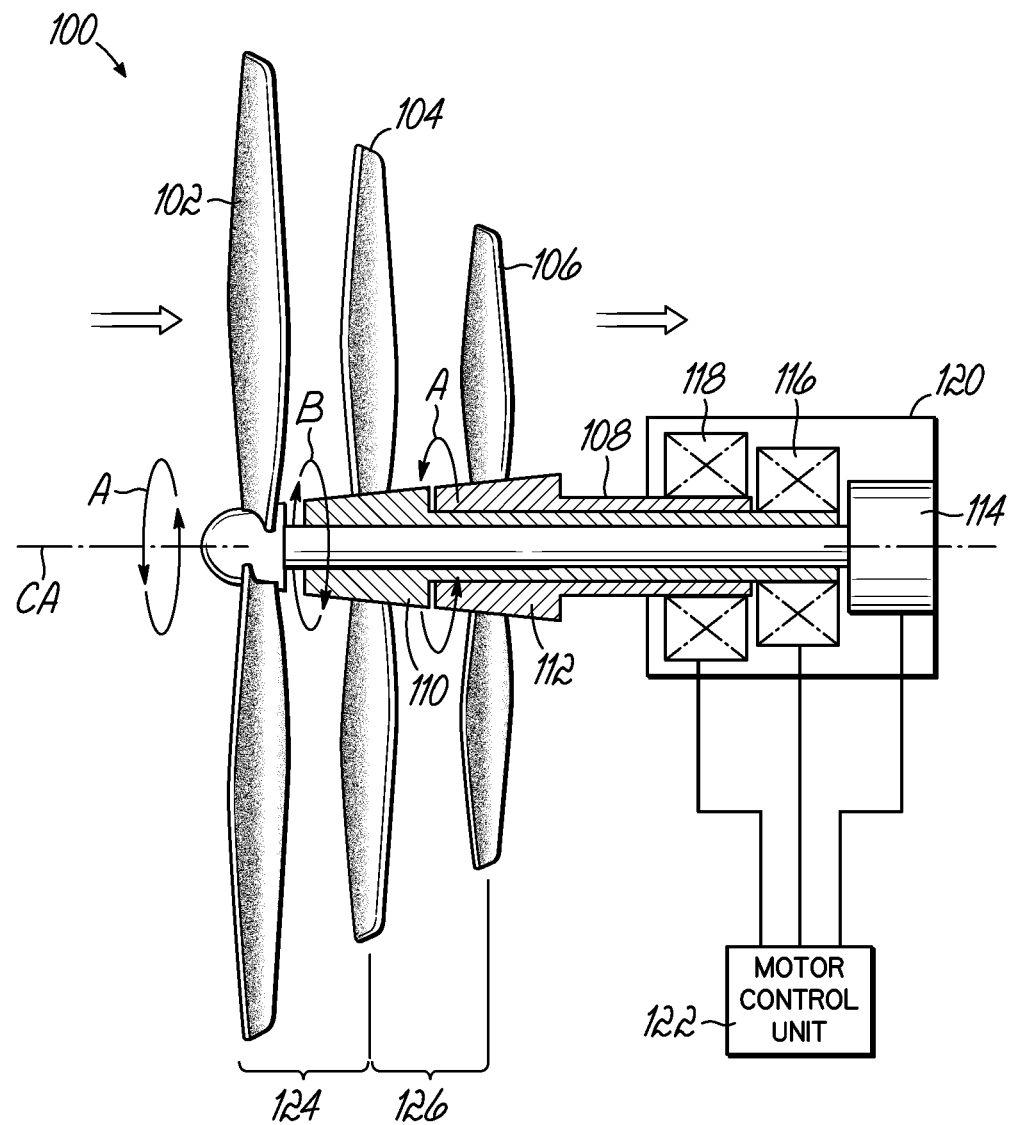
FIG. 5 is a schematic representation of a horizontally-oriented, propulsion system according to another embodiment of the invention.

A two-cell propulsion system 100 according to another embodiment of the invention is depicted in FIG. 5. Propulsion system 100 includes three propellers 102, 104, 106 attached to three shafts 108, 110, 112, respectively. The three shafts 108, 110, 112 are connected to three different motors 114, 116, 118, respectively, which may be contained in a unitary housing 120. The three motors 114, 116, 118 may be connected to a motor control unit 122, which is configured to control the speed and rotational direction of the three motors 114 116, 118 independently of one another. As like the other propulsion systems 50, 90, each of the propellers 102, 104, 106 has a diameter where the diameter of propeller 102 is greater than the diameter of propeller 104 and the diameter of propeller 104 is greater than the diameter of propeller 106. The pitch of each propeller 102, 104, 106 may be changed independently of each other.

Propellers 102, 106 turn in the counter-clockwise direction (when view looking left to right in FIG. 5) as indicated by the Arrow A and propeller 104 turns in the clockwise direction as indicated by the Arrow B. The direction of the airflow is indicated by the Arrow C. One cell 124 is formed by propellers 102, 104, which are counter-rotating relative to each other. Another cell 126 is formed by propellers 104, 106, which are counter-rotating relative to each other.

Propulsion systems 50, 90 may be considered vertically oriented in that the axes of the shafts 58, 62, and thus their common axis CA, are substantially vertically oriented. In contrast, propulsion system 100 may be considered horizontally oriented in that the axes of the shafts 108, 110, 112, and thus their common axis CA, is substantially horizontally oriented. Depending upon how the propulsion system is used in practice, the axes of the shafts may be tilted some angle or a range of angles from vertical or from horizontal. Moreover, while the propulsion systems 50, 100 are described above relative to a UAV, those propulsion systems 50, 100 may be used in other applications, such as land-based vehicles or sea-based vehicles, for example.

While the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A propulsion system comprising:
   a first propeller;
   a second propeller;
   a third propeller;
   a first motor; and
   a second motor,
   wherein the first propeller, the second propeller, and the third propeller are arranged to rotate about a common axis and the second propeller is disposed between the first propeller and the third propeller,
   wherein the first propeller and the third are configured to rotate about the common axis in a first direction and the second propeller is configured to rotate about the common axis in a second direction opposite to the first direction,
   wherein the first motor is coupled to the first and third propellers and configured to rotate the first and third propellers in the first direction, and
   wherein the second motor is coupled to the second propeller and configured to rotate the second propeller in the second direction.

2. The propulsion system of claim 1, further comprising:
   a first shaft and a second shaft arranged along the common axis,
   wherein the first propeller and the third propeller are coupled to the first shaft and the second propeller is coupled to the second shaft.

3. The propulsion system of claim 1, wherein the first motor and second motor are arranged along the common axis, the first motor being disposed between the first propeller and the second propeller and the second motor being disposed between the second propeller and the third propeller.

4. The propulsion system of claim 1, wherein the first motor and second motor are arranged along the common axis, the first motor and the second motor being disposed between the second propeller and the third propeller.

5. The propulsion system of claim 1, wherein the first propeller has a diameter D1, the second propeller has a diameter D2, and the third propeller has a diameter D3, wherein diameter D1 is greater than diameter D2 and diameter D2 is greater than diameter D3.

6. The propulsion system of claim 1, wherein the common axis is oriented substantially vertically.

7. The propulsion system of claim 1, wherein the common axis is oriented substantially horizontally.

8. The propulsion system of claim 1, further comprising a motor control unit operatively coupled to the first motor and the second motor, the motor control unit configured to independently control a rotational speed of the first motor and a rotational speed of the second motor.

* * * * *